US012616558B2

(12) United States Patent
Bell et al.

(10) Patent No.: US 12,616,558 B2
(45) Date of Patent: May 5, 2026

(54) DIRECT-SNAP DENTAL ABUTMENT SYSTEMS

(71) Applicants: Patrick C. Bell, La Crosse, WI (US);
Michael A. Mathews, Melrose, WI
(US); Thomas J. Arendt, Norwalk, WI
(US); Leo J. Malin, La Crosse, WI
(US)

(72) Inventors: Patrick C. Bell, La Crosse, WI (US);
Michael A. Mathews, Melrose, WI
(US); Thomas J. Arendt, Norwalk, WI
(US); Leo J. Malin, La Crosse, WI
(US)

( * ) Notice: Subject to any disclaimer, the term of this
patent is extended or adjusted under 35
U.S.C. 154(b) by 506 days.

(21) Appl. No.: 18/129,832

(22) Filed: Apr. 1, 2023

(65) Prior Publication Data

US 2024/0325123 A1     Oct. 3, 2024

(51) Int. Cl.
*A61C 8/00*          (2006.01)
*A61C 13/00*          (2006.01)

(52) U.S. Cl.
CPC .......... *A61C 8/0062* (2013.01); *A61C 8/0013*
(2013.01); *A61C 8/0056* (2013.01); *A61C*
*8/0074* (2013.01); *A61C 13/0004* (2013.01);
*A61C 13/0019* (2013.01)

(58) Field of Classification Search
CPC ... A61C 8/0062; A61C 8/0013; A61C 8/0056;
A61C 8/0074; A61C 8/005; A61C
8/0048; A61C 8/0012; A61C 13/0004;
A61C 13/0019; A61C 13/0003; A61C
13/00
USPC ...................................... 433/173–176, 201.1
See application file for complete search history.

(56) References Cited

U.S. PATENT DOCUMENTS

| | | | |
|---|---|---|---|
| 5,350,297 | A | 9/1994 | Cohen |
| 5,829,977 | A | 11/1998 | Rogers et al. |
| 6,332,777 | B1 | 12/2001 | Sutter |
| 10,682,210 | B1 | 6/2020 | LaMar et al. |
| 11,246,684 | B2 | 2/2022 | Doswell et al. |
| 11,311,354 | B2 | 4/2022 | Kofford et al. |
| 11,571,282 | B2 | 2/2023 | Chu et al. |
| 11,596,504 | B2 | 3/2023 | Stratton et al. |

(Continued)

FOREIGN PATENT DOCUMENTS

| WO | WO2014064117 | 1/2014 | |
| WO | WO-2022174165 A1 * | 8/2022 | ............. B33Y 10/00 |

OTHER PUBLICATIONS

Mullaly et al., Fixed Hybrid Dental Attachment Device,
KR-20150095696-A, machine translation, (Year: 2015).*

(Continued)

*Primary Examiner* — Eric J Rosen
*Assistant Examiner* — Mirayda A Aponte
(74) *Attorney, Agent, or Firm* — bobharter.com; Robert J.
Harter

(57)          ABSTRACT

Example dental assemblies and methods involve snap-fitting
a denture or other dental prosthesis to a patient's jaw. In
some examples, an implant is anchored to the jaw, an
abutment is screwed to the implant, and a head of the
abutment snaps directly into a pocket created in the dental
prosthesis. In some examples, a polymeric cap couples the
abutment's head to the pocket. Based on coordinate data
from a CT or intraoral scanner, the pocket can be created by
CNC milling or 3D printing. The method eliminates the need
for bonding a metal housing or casing to the dental pros-
thesis.

15 Claims, 14 Drawing Sheets

(56) References Cited

U.S. PATENT DOCUMENTS

| 2008/0176185 A1 | 7/2008 | Williams | |
| 2010/0055645 A1* | 3/2010 | Mullaly | A61C 8/0075 |
| | | | 433/215 |
| 2017/0202649 A1 | 7/2017 | Bernhard et al. | |
| 2018/0049849 A1 | 2/2018 | Lamar et al. | |
| 2020/0107914 A1 | 4/2020 | Kofford et al. | |
| 2020/0214809 A1 | 7/2020 | Fix | |
| 2020/0383757 A1 | 12/2020 | Hale | |
| 2021/0275279 A1 | 9/2021 | Kofford et al. | |
| 2021/0393377 A1 | 12/2021 | Connell et al. | |
| 2022/0125558 A1 | 4/2022 | Abenaim | |
| 2022/0387144 A1 | 12/2022 | Kofford et al. | |
| 2023/0017829 A1 | 1/2023 | Toscano et al. | |

OTHER PUBLICATIONS

Benz et al, Abutment and Dental-Prosthetic Arrangement Having Such an Abutment, EP-2624781-B1, machine translation, (Year: 2015).*

* cited by examiner

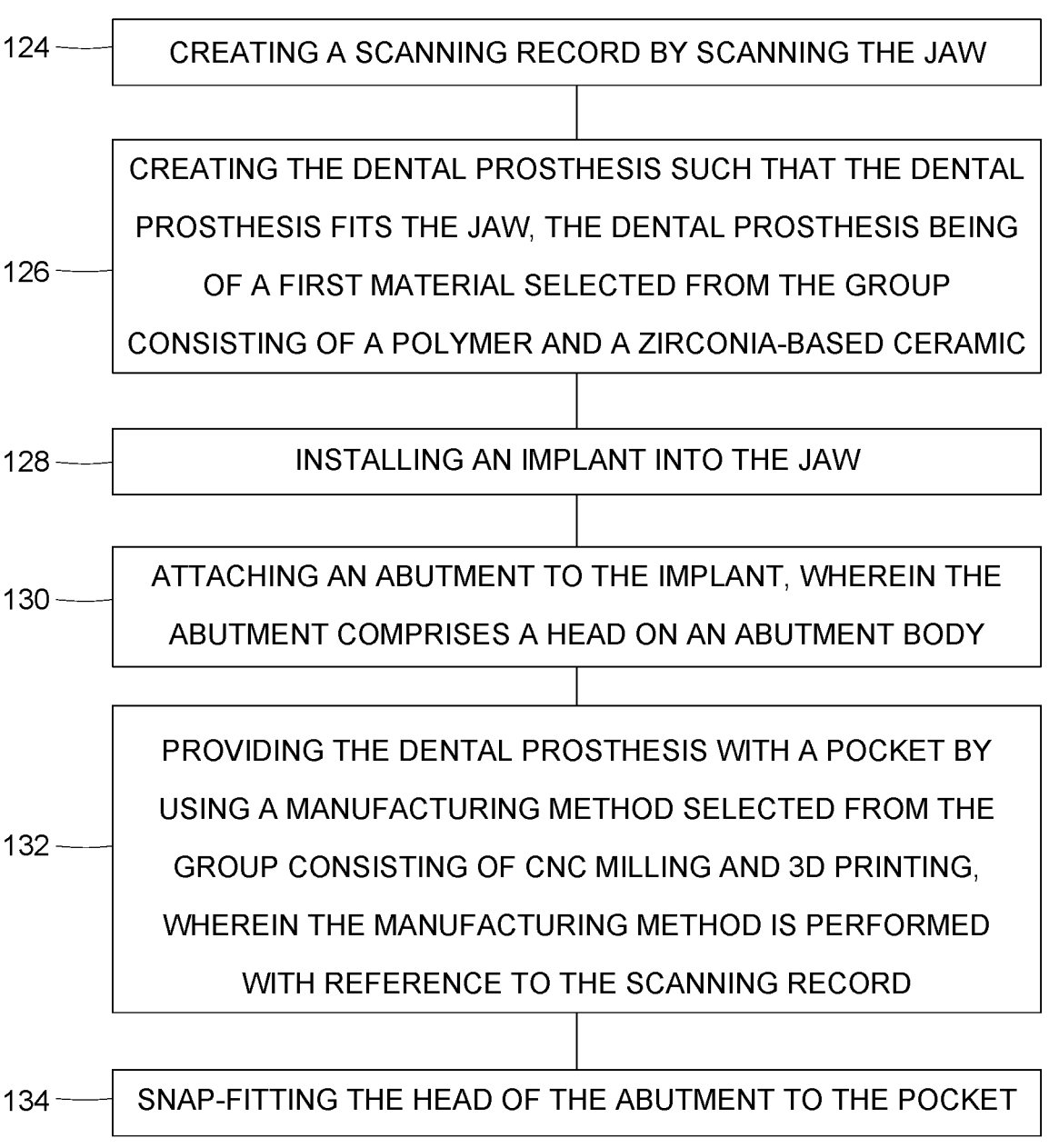

124 — CREATING A SCANNING RECORD BY SCANNING THE JAW

126 — CREATING THE DENTAL PROSTHESIS SUCH THAT THE DENTAL PROSTHESIS FITS THE JAW, THE DENTAL PROSTHESIS BEING OF A FIRST MATERIAL SELECTED FROM THE GROUP CONSISTING OF A POLYMER AND A ZIRCONIA-BASED CERAMIC

128 — INSTALLING AN IMPLANT INTO THE JAW

130 — ATTACHING AN ABUTMENT TO THE IMPLANT, WHEREIN THE ABUTMENT COMPRISES A HEAD ON AN ABUTMENT BODY

132 — PROVIDING THE DENTAL PROSTHESIS WITH A POCKET BY USING A MANUFACTURING METHOD SELECTED FROM THE GROUP CONSISTING OF CNC MILLING AND 3D PRINTING, WHEREIN THE MANUFACTURING METHOD IS PERFORMED WITH REFERENCE TO THE SCANNING RECORD

134 — SNAP-FITTING THE HEAD OF THE ABUTMENT TO THE POCKET

DIRECT-SNAP DENTAL ABUTMENT SYSTEMS

FIELD OF THE DISCLOSURE

This patent generally pertains to dentistry and more specifically to abutments for connecting a denture or other dental prosthesis to a patient's jaw.

BACKGROUND

Dental implants and prostheses have been used for decades to replace missing teeth and have become an increasingly popular treatment option due to their durability, reliability, and natural appearance. Dental implants are artificial tooth roots that are surgically placed into the jawbone to support replacement teeth or bridges, while dental prostheses are artificial teeth that are designed to replace one or more missing teeth. Abutments are small connectors for fastening a dental prosthesis to an implant.

To create a custom-fitted prosthesis, a dentist will typically take impressions or molds of the patient's teeth and jaw. In addition or alternatively, the dentist may also use CT scans and CAD/CAM technology to create three-dimensional images of the jaw, including images of any teeth, implants and fiducial markers that may exist. The images can be used to help design and fabricate a custom prosthesis. Prostheses can be made from a variety of materials, including acrylic and ceramic.

Overall, dental implants and prostheses are effective and long-lasting treatment options for patients with missing teeth. With advances in technology and materials, dentists are able to create custom-fitted prostheses that look and function like natural teeth, helping patients to regain their confidence and oral health.

BRIEF DESCRIPTION OF THE DRAWINGS

FIG. 18 is a flow diagram showing various steps of a dental method in accordance to the teachings disclosed herein.

DETAILED DESCRIPTION

Figures 1, 2, 3:
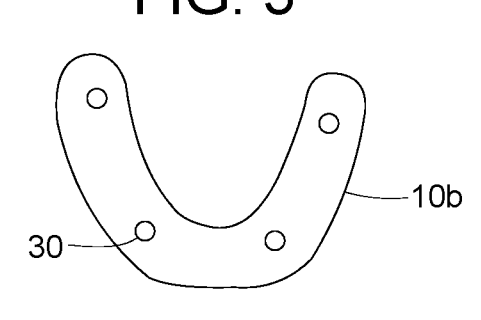
FIG. 1 is a front view of an example dental abutment about to be screwed into an implant that's attached to the jaw of a patient, wherein the implant and jaw are shown in cross-section, and the dental assembly is constructed in accordance with the teachings disclosed herein.
FIG. 2 is a top view of an example upper dental prosthesis taken along line 2-2 of FIG. 1.
FIG. 3 is a top view similar to FIG. 2 but showing an example lower dental prosthesis.

FIGS. 1-18 pertain to devices, assemblies, systems and methods for snap-fitting a dental prosthesis 10 (e.g., dental prosthesis 10a, 10b, 10c and 10d) to a jaw 12 of a patient 14. The terms, "snap-fit" and "snap-fitting" refer to two interlocking parts such that as the two parts are being pressed together, an interference fit between the two parts is initially relatively tight but is subsequently looser upon reaching the final fully connected configuration of the two parts. Snap-fitting parts often provide a tactile or audible click when pressed together. A snap-fit is one example of removable means for connecting two or more parts. The term, "removable means" refers to parts that can be separated without breaking any bonding material or parts.

The terms, "dental prosthesis" and "dental prosthetic" refer to any structure attachable to a patient's jaw, wherein the structure includes a feature that resembles at least one tooth. Some examples of a dental prosthesis include an upper denture, a lower denture, a crown, a set of crowns, bridges, etc. In the illustrated examples, the jaw 12 (e.g., maxilla or mandible) comprises a jawbone 12b and its overlying gingiva 12a.

Figure 4:
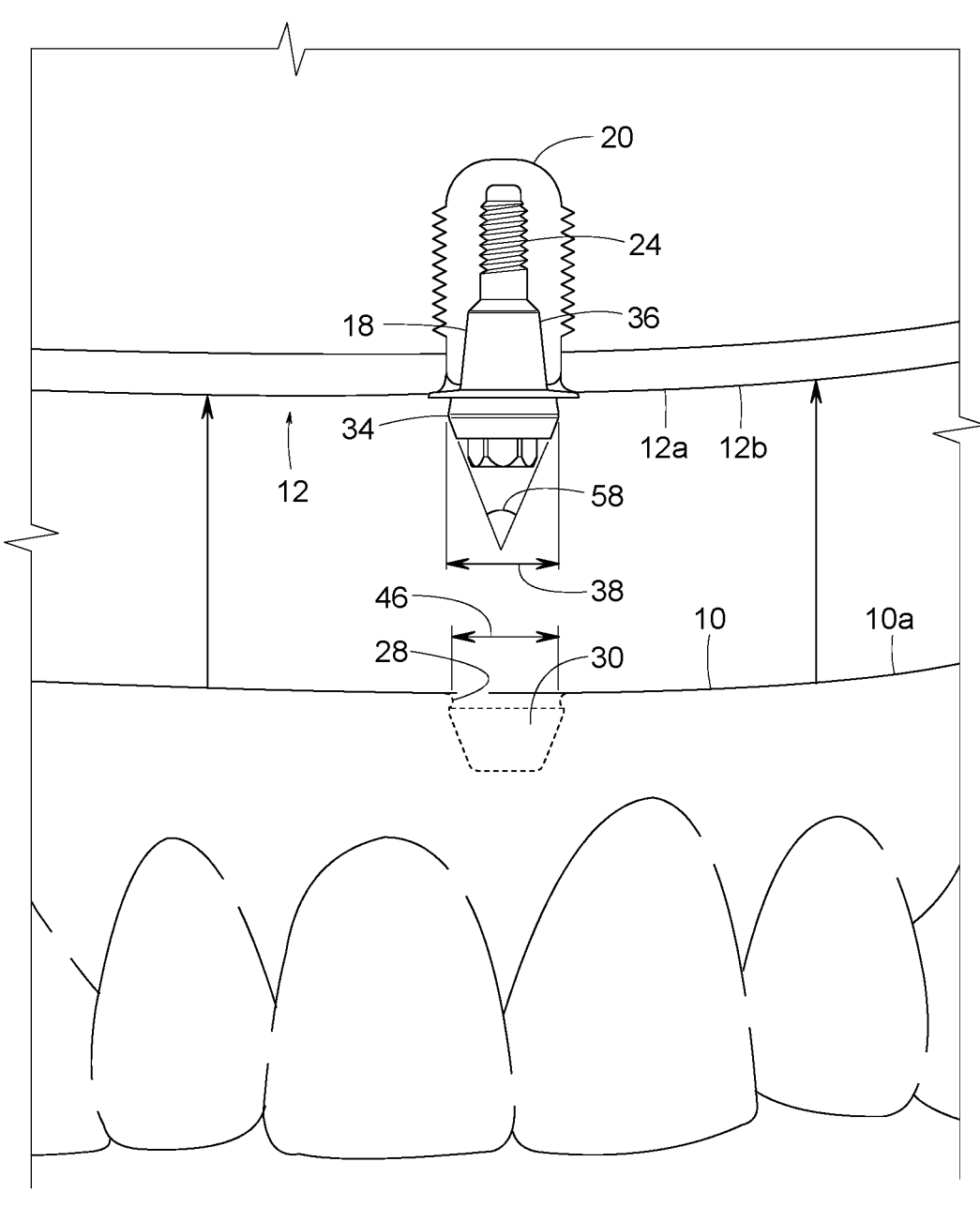
FIG. 4 is a front view similar to FIG. 1 but showing the dental abutment attached to the implant.
Figure 5:
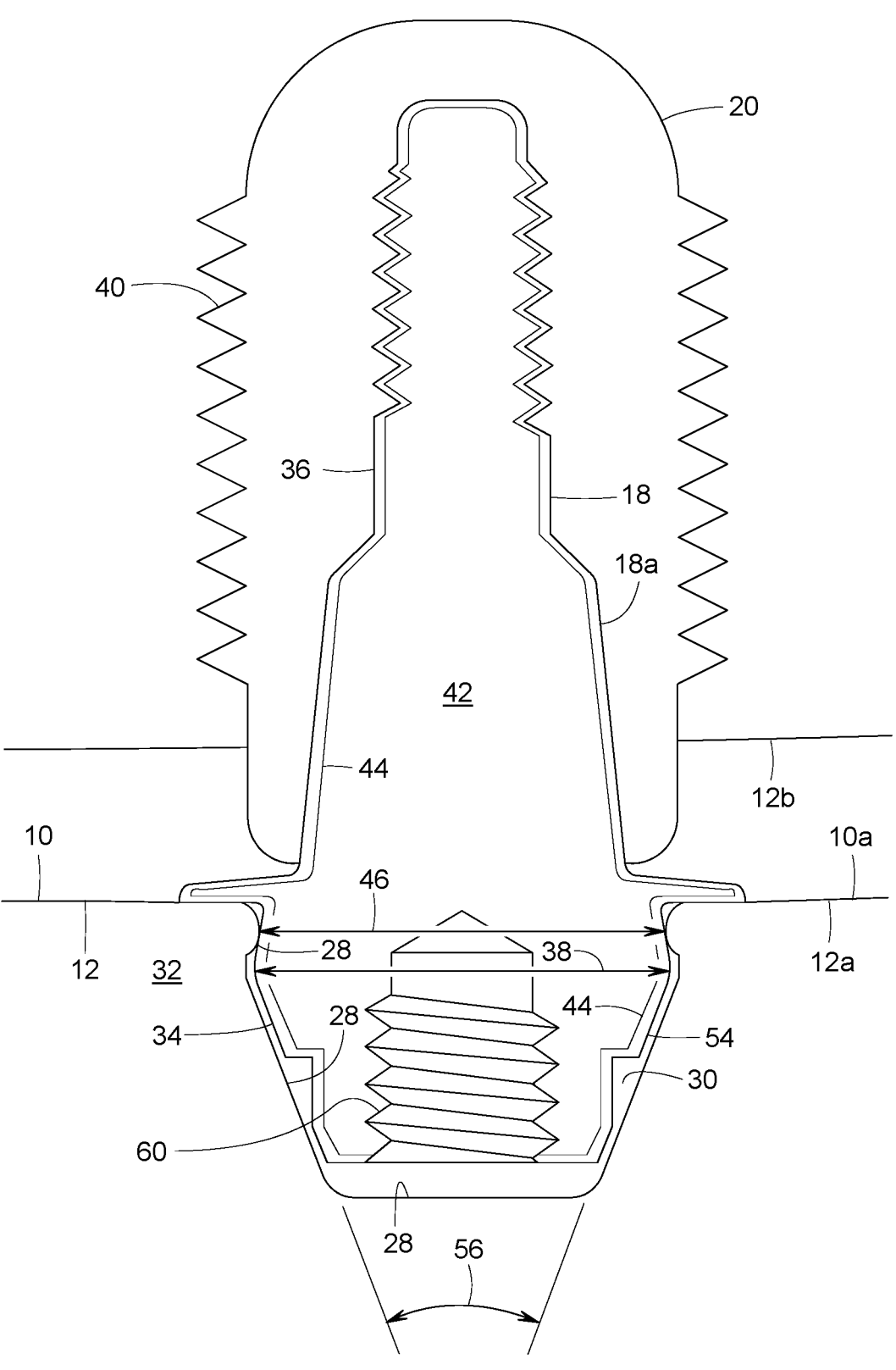
FIG. 5 is an enlarged cross-sectional view of the abutment and implant of FIGS. 1 and 4.
Figure 6:
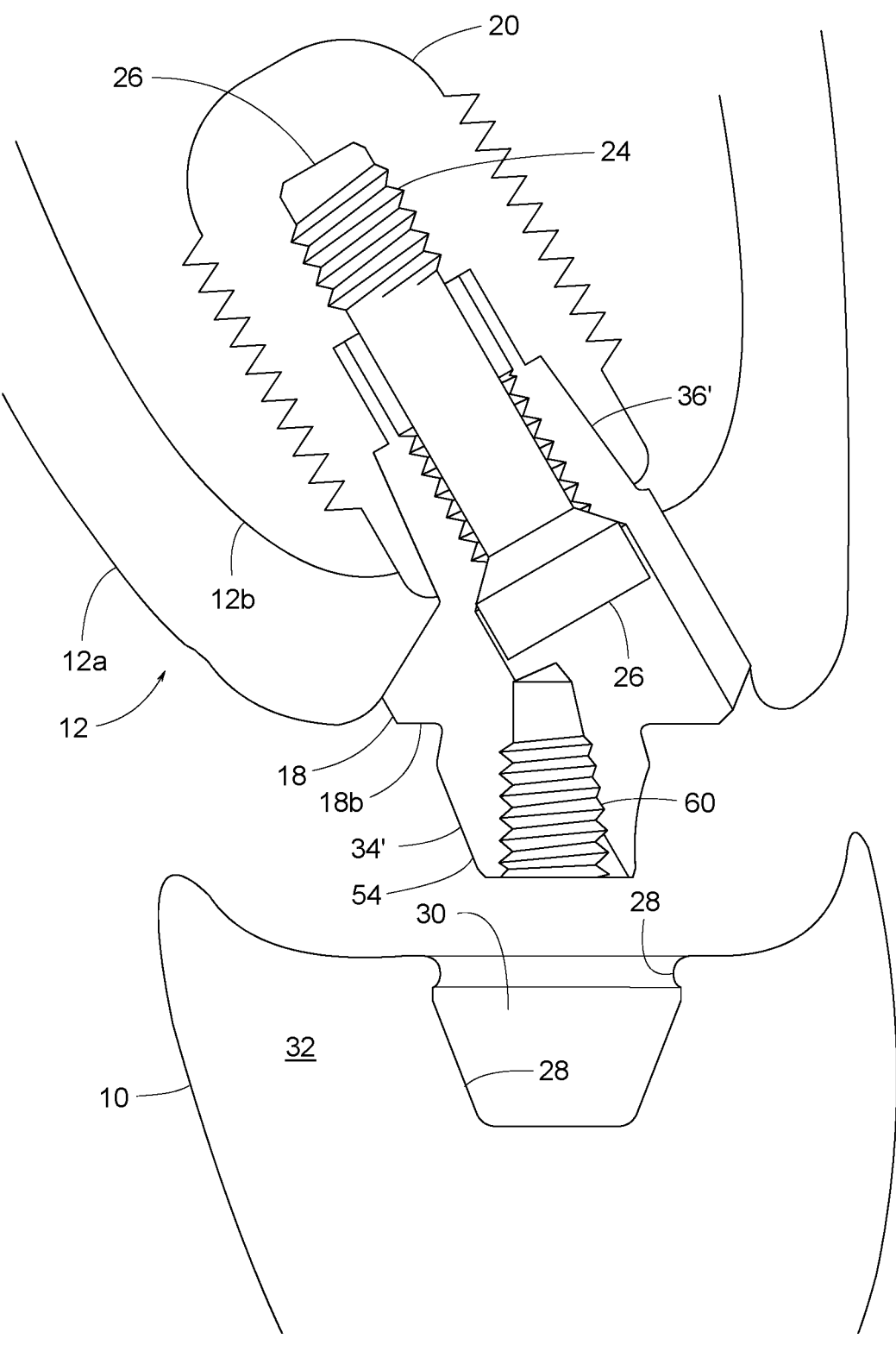
FIG. 6 is a cross-sectional view similar to FIG. 5 but showing an angular abutment attached to an implant but not yet connected to a dental prosthesis.
Figure 7:
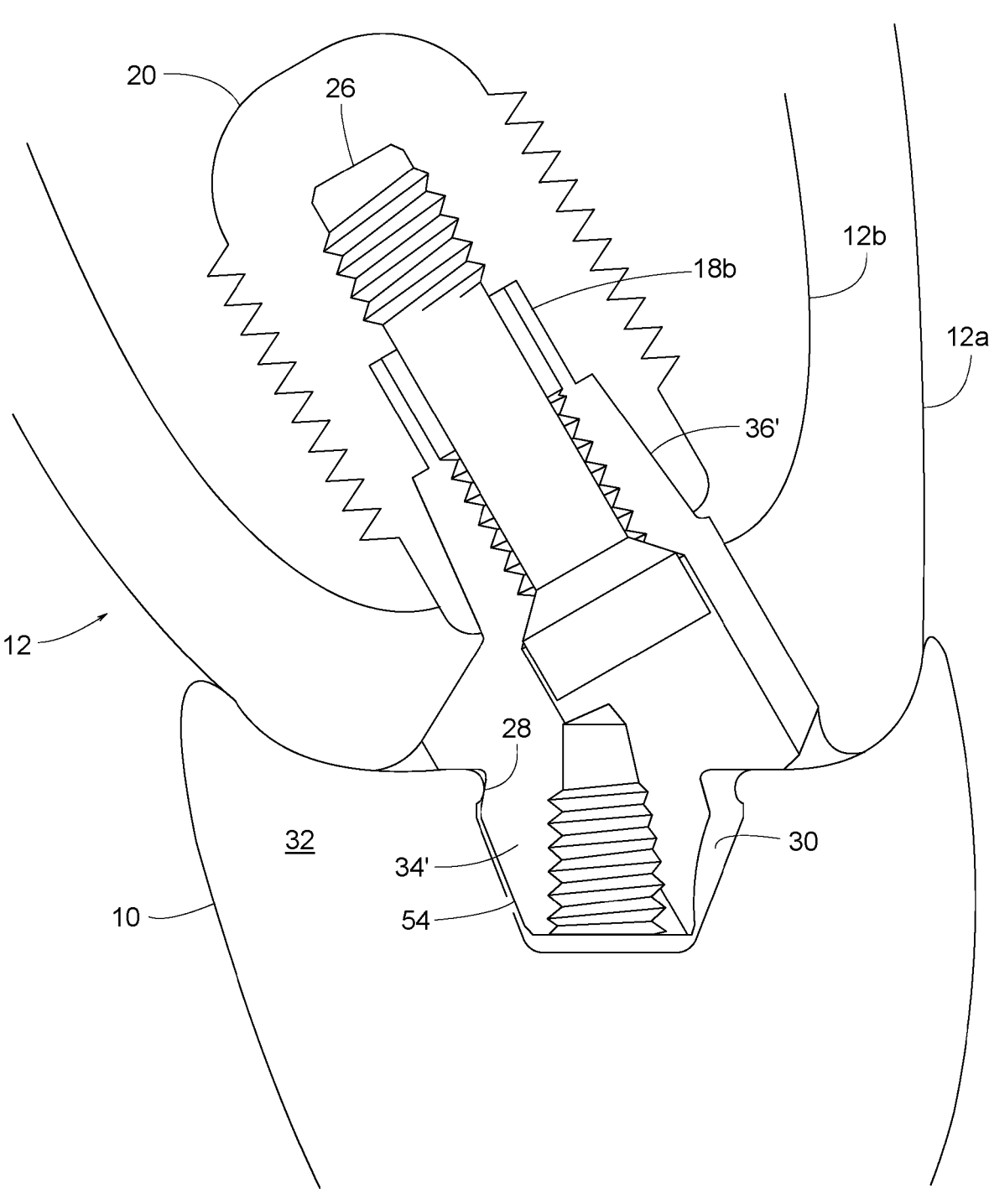
FIG. 7 is a cross-sectional view similar to FIG. 6 but showing the dental prosthesis snapped onto the angular abutment.

FIGS. 1-5 show one example of a dental assembly 16 connectable to the jaw 12 of the patient 14. This example of the dental assembly 16 includes the dental prosthesis 10 and an abutment 18. The abutment 18 can be a straight abutment 18a, as shown in FIGS. 1, 4 and 5: or the abutment 18 can be an angular abutment 18b, as shown in FIGS. 6 and 7.

In this example, a known implant 20 is screwed 22 into or otherwise anchored to the patient's jawbone 12b. The abutment 18 connects to the implant 20 by way of a threaded connection 24. Some examples of the threaded connection 24 include an integral part of the abutment 18 (FIGS. 1, 4 and 5). In other examples, the threaded connection 24 includes a separate screw 26 (FIGS. 6 and 7).

In the example shown in FIGS. 1-5, the dental prosthesis 10 includes a pocket inner surface 28 defining a pocket 30 in the dental prosthesis 10. The dental prosthesis 10 can have any number of pockets 30. FIG. 2 shows the dental prosthesis 10a with five pockets 30. FIG. 3 shows the dental prosthesis 10b with four pockets 30.

In some examples, the pocket inner surface 28 is made of a first material 32 selected from the group consisting of a polymer (e.g., acrylic) and a zirconia-based ceramic. The term, "zirconia-based ceramic" refers to any material that includes at least some zirconium dioxide. In some examples, the dental prosthesis 10 is a unitary monolithic structure made essentially entirely of the first material 32, wherein the unitary monolithic structure includes the pocket inner surface 28.

In some examples, the abutment 10 comprises a head 34 extending from an abutment body 36. In some examples, the combination of the abutment body 36 and the head 34 is a unitary monolithic piece.

The abutment's head 34 has selectively an engaged position (FIG. 5) and a disengaged position (FIG. 4) relative to the dental prosthesis 10. In some examples, the head 34 has a snap-fit head OD 38. At least most of the head 34 is sized to fit within the pocket 30. In some examples, the abutment body 36 is connectable to the jaw 12 by way of the implant 20 and a threaded connection 40. The head 34 engages the pocket inner surface 38 when the head 34 is in the engaged position (FIG. 5). The head 34 is spaced apart from the dental prosthesis 10 when the head 34 is in the disengaged position (FIG. 4).

In some examples, the abutment 18 comprises a base material 42 with a titanium nitride coating 44. In some examples, the titanium nitride coating 44 is two to four microns thick. In some examples, the abutment's base material 42 is mostly titanium (e.g., pure titanium or alloy thereof). In some examples, the first material 32 of the dental prosthesis 10 is harder than the base material 42 of the abutment 18. This is can be a benefit, as a worn dental prosthesis 10 is often more expensive to replace than a worn abutment 18. In some examples, the titanium nitride coating 44 can reduce friction and increase the wear resistance of the abutment 18.

In some examples, the snap-fit between the abutment 18 and the dental prosthesis 10 is by virtue of the snap-fit head OD 38 being greater than a pocket rim ID 46 of the pocket 30. The term, "ID" refers to an inner diameter. The term, "OD" refers to an outer diameter. The ID and OD can be measured across a full circle 48 (right side of FIG. 14) or across a partial circle 50 (left side of FIG. 14). In some examples, a full or partial circle 48 or 50 can be defined by two or more protuberances 52, as shown on the right side of FIGS. 15 and 16.

Figure 10:
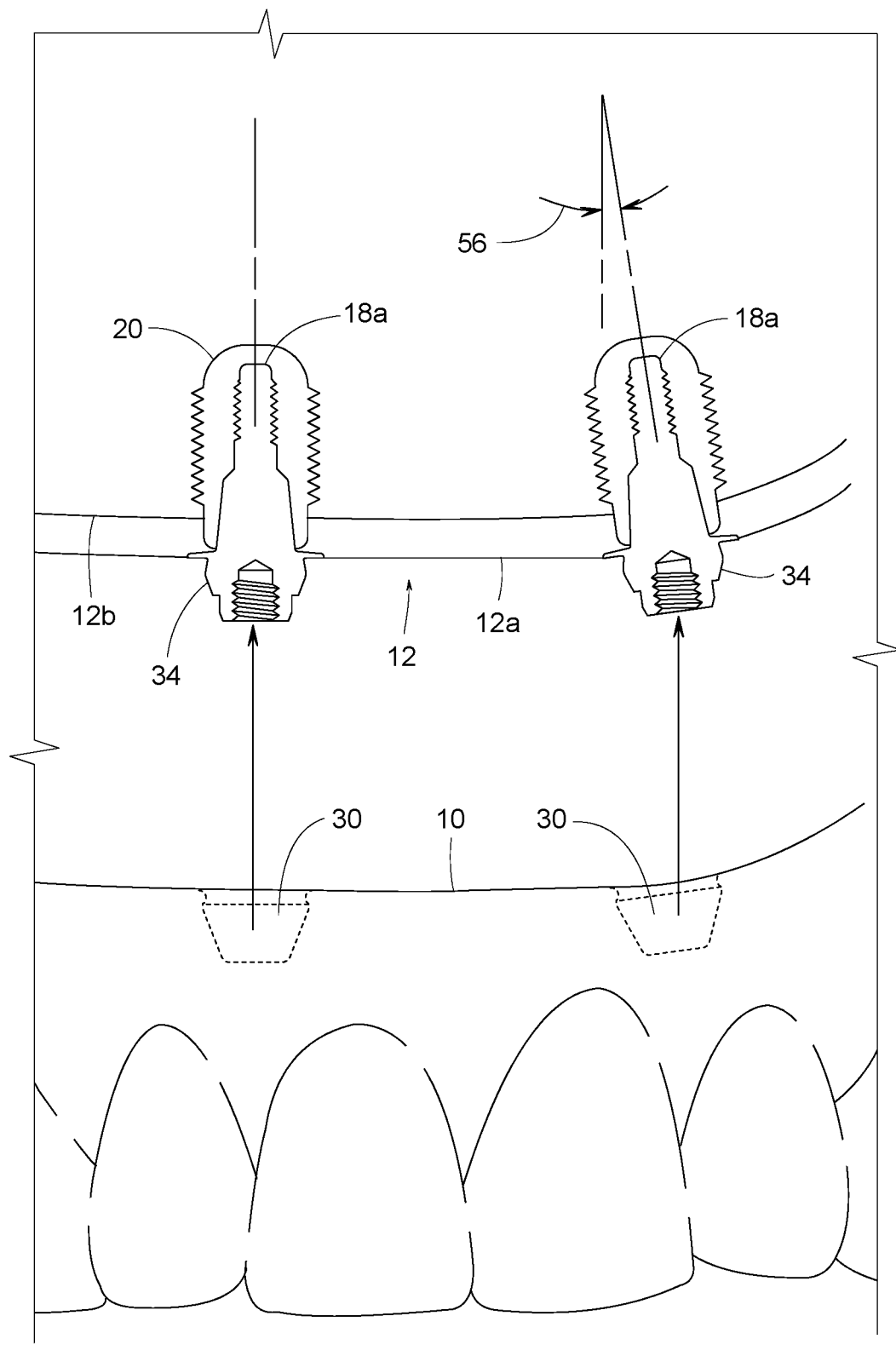
FIG. 10 is a front view similar to FIG. 8 but showing two straight abutments attached to the jaw.

In some examples, the head 34 of the abutment 18 has a frustoconical portion 54, which accommodates multiunit abutments with a broad range of angular divergence 56 (FIG. 10). Angular divergence 56 is the angular deviation between two abutments 18 in the same prosthesis 10.

In some examples, the frustoconical portion 54 has an apex angle 58 substantially equal to 43 degrees. An apex angle substantially equal to 43 degrees means that the angle is within five degrees of 43 degrees (i.e., 38 to 48 degrees). Other examples of the head 34 have different shapes, such as spherical, oblique conical, conical with apex angle of 40 to 90 degrees, pyramid, parabolic, oblong, rounded cone, various combinations, portions, and blends thereof.

FIGS. 6 and 7 show the angular abutment 18b comprising a head 34' extending from an abutment body 36'. In some examples, the combination of the abutment body 36' and the head 34' is a unitary monolithic piece.

The abutment's head 34 has selectively an engaged position (FIG. 7) and a disengaged position (FIG. 6) relative to the dental prosthesis 10. In some examples, the head 34' has a snap-fit head OD 38. In some examples, the snap-fit between the abutment 18b and the dental prosthesis 10 is by virtue of the snap-fit head OD 38 being greater than the pocket rim ID 46 of the pocket 30. Some examples of the head 34 and 34' include an optional threaded hole 60 for fastening the dental prosthesis 10 to the abutment 18 using a separate screw instead of a snap-fit.

At least most of the head 34' is sized to fit within the pocket 30. In this example, the abutment body 36' is connected to the jaw 12 by way of the implant 20 and the threaded connection 24, wherein the threaded connection 24 includes the separate screw 26. The head 34' engages the pocket inner surface 28 when the head 34' is in the engaged position (FIG. 7). The head 34' is spaced apart from the dental prosthesis 10 when the head 34' is in the disengaged position (FIG. 6).

In some examples, the head 34' of the abutment 18b has a frustoconical portion 54, which accommodates multiunit abutments with a broad range of angular divergence 56 (FIG. 10). With the angular abutment 18b, a portion 62 (FIG. 14) of the frustoconical portion 54 is cutaway to receive the screw 26.

In some examples of the angular abutment 18b, the frustoconical portion 54 has an apex angle 56 substantially equal to 43 degrees. Other examples of the head 34' have different shapes, such as spherical, oblique conical, conical with apex angle of 40 to 90 degrees, pyramid, parabolic, oblong, rounded cone, and various combinations and blends thereof.

Figure 8:
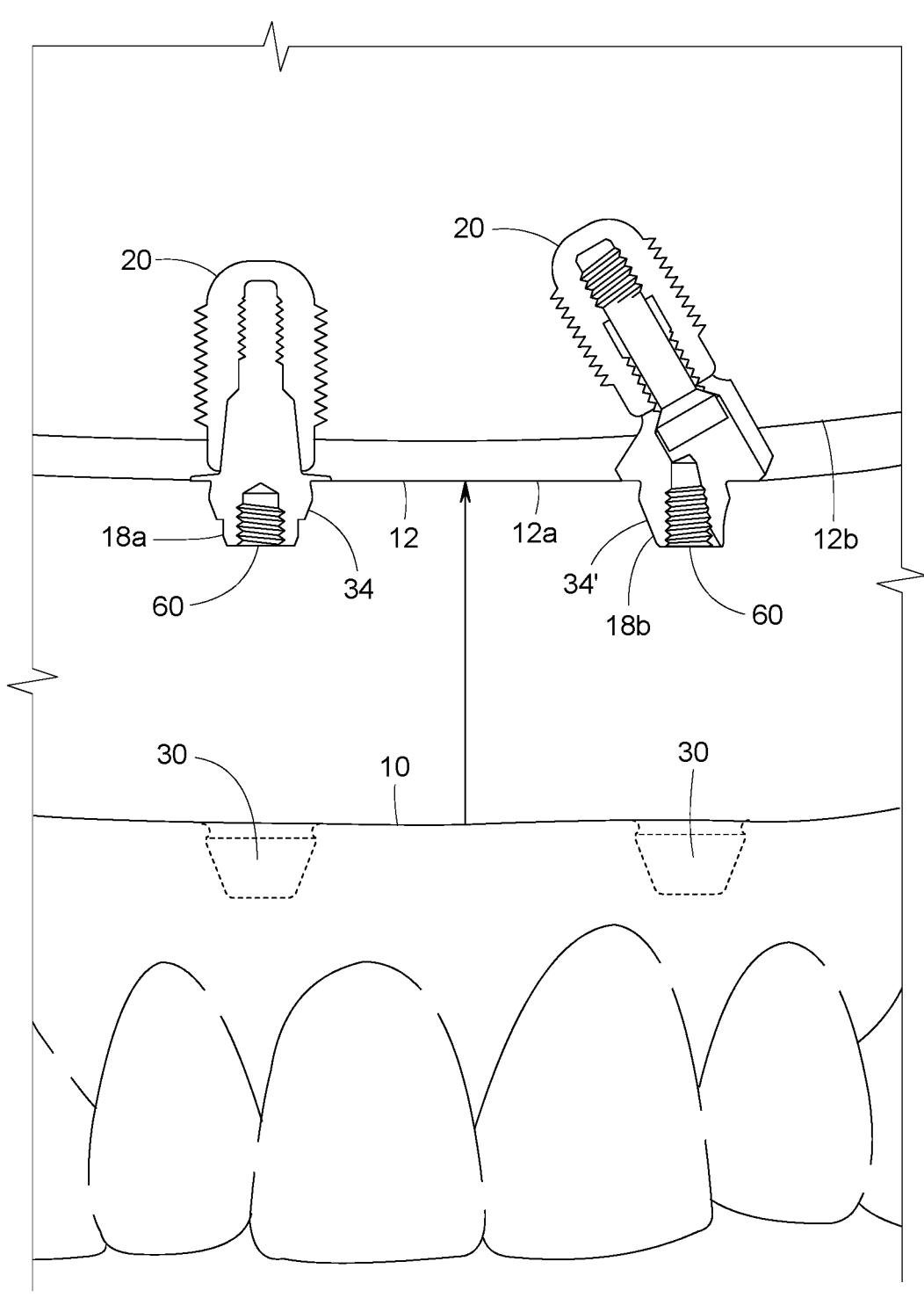
FIG. 8 is a front view similar to FIG. 4 but showing a straight abutment and an angular abutment attached to the jaw.
Figure 9:
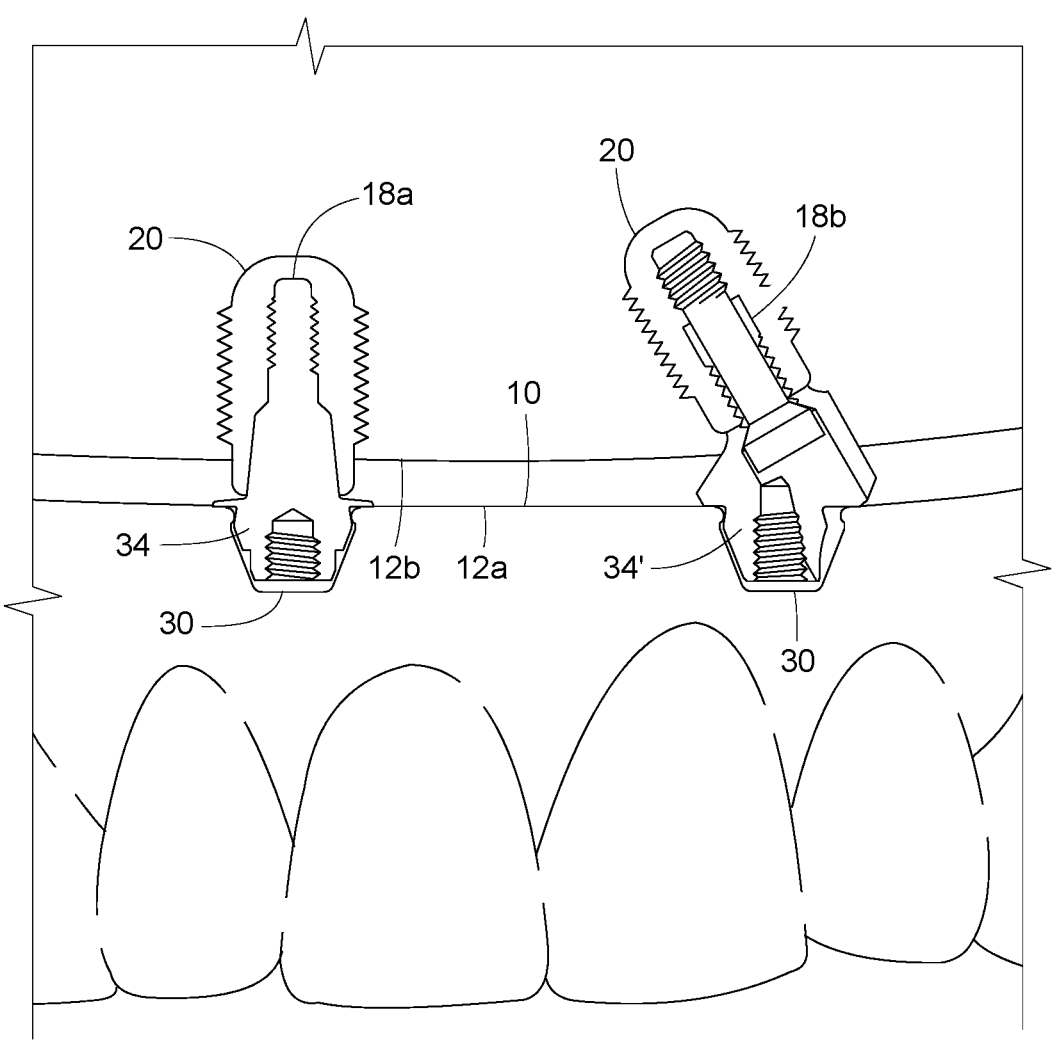
FIG. 9 is a front view similar to FIG. 8 but showing the dental prosthesis snapped onto the two abutments.

FIGS. 8 and 9 show how both straight abutments 18a and angular abutments 18b can be installed on the same jaw 12 for providing a secure connection to the dental prosthesis 10. FIG. 8 shows the dental prosthesis 10 separated from the jaw 12, and FIG. 9 shows the dental prosthesis 10 attached to the jaw 12.

FIG. 10 shows how two straight abutments 18a can be installed on the same jaw 12. In the illustrated example, the two abutments 18a lie at different angles, thereby creating some angular divergence 56.

Figure 11:
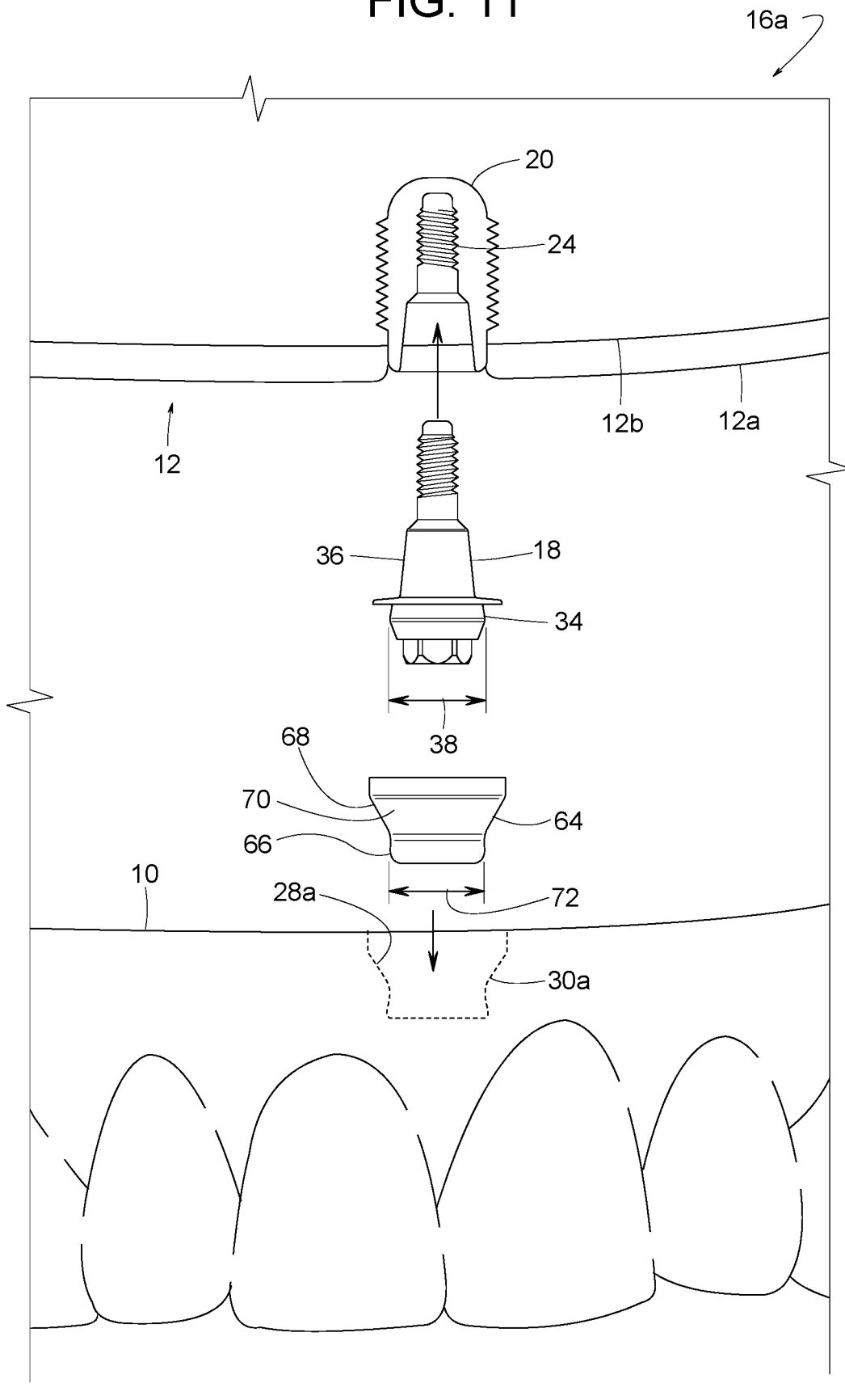
FIG. 11 is a front view of another example dental abutment about to be screwed into an implant that's attached to the jaw of a patient, wherein the implant and jaw are shown in cross-section, and the dental assembly is constructed in accordance with the teachings disclosed herein.
Figure 12:
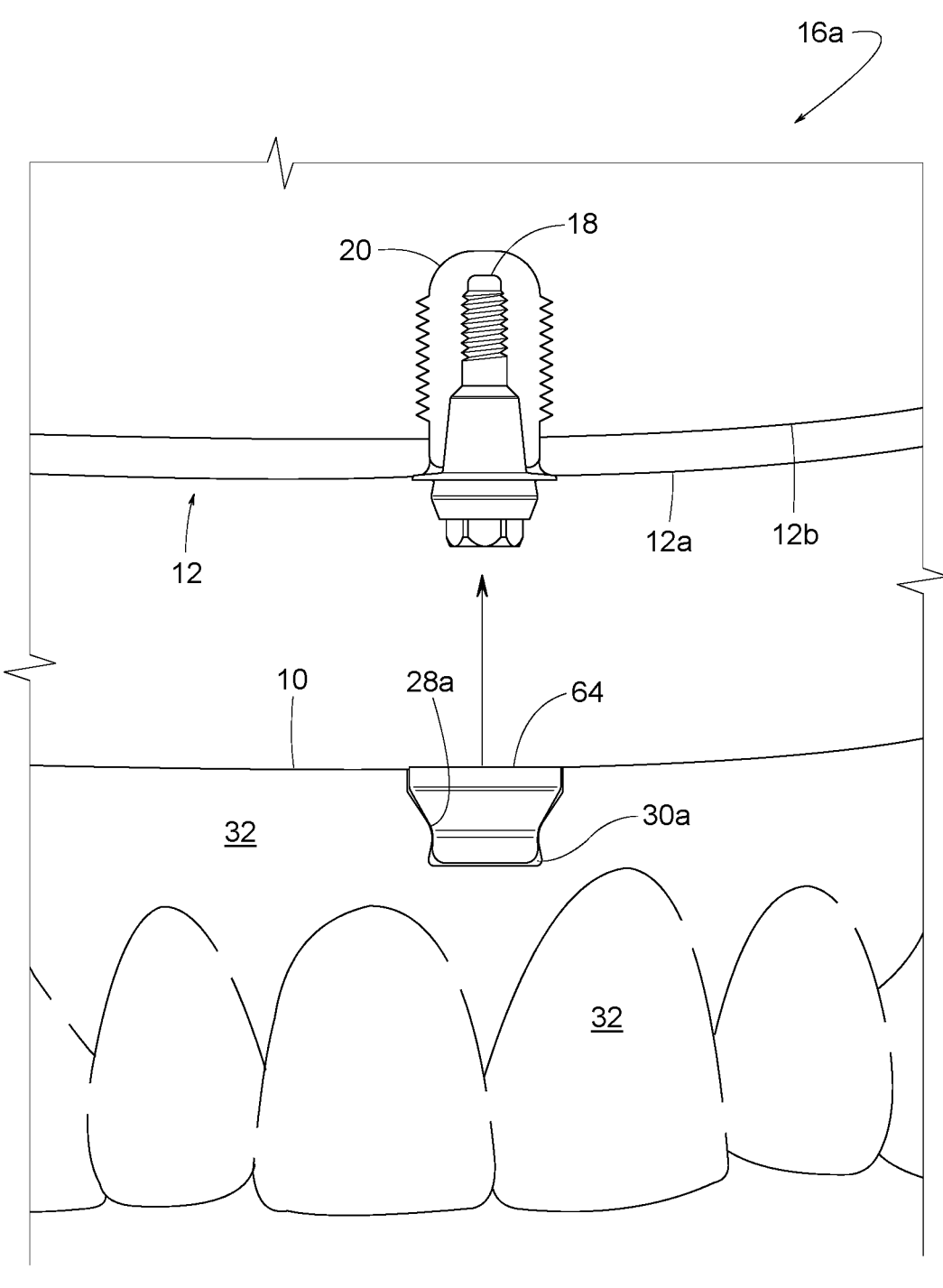
FIG. 12 is similar to FIG. 11 but showing the abutment attached to the implant and showing a polymeric cap attached to the dental prosthesis.
Figure 13:
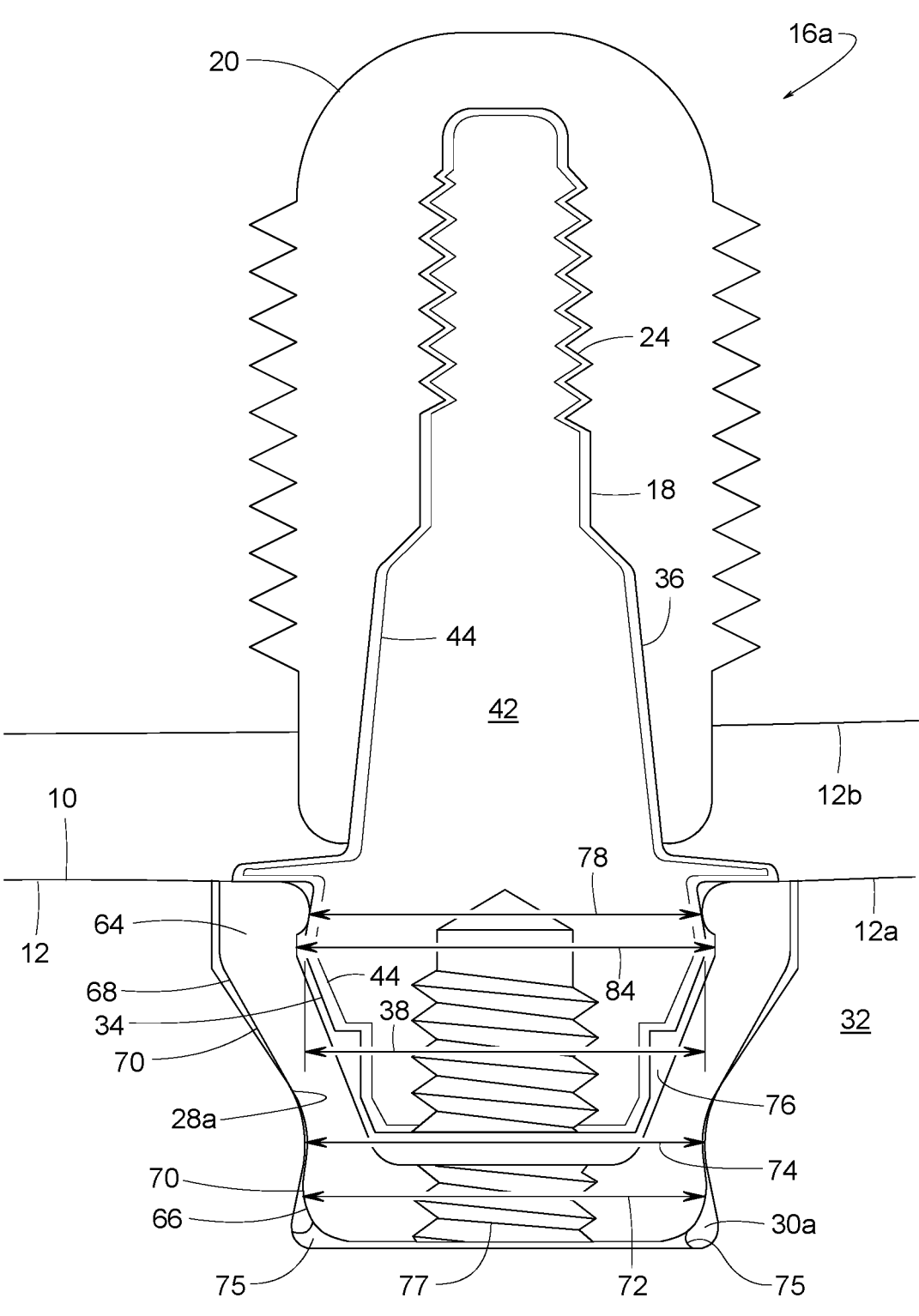
FIG. 13 is an enlarged cross-sectional view of the abutment, the polymeric cap, and the implant of FIGS. 11 and 12.

An example dental assembly 16a shown in FIGS. 11-13 is similar to that of FIGS. 1-5 but with the addition of a polymeric cap 64 and a larger pocket 30a in the dental prosthesis 10 to receive the polymeric cap 64. The polymeric cap 64 is an easily replaceable part that helps reduce wear of both the abutment's head 34 and the pocket inner surface 28a of the dental prosthesis 10.

In some examples, the polymeric cap 64 comprising a plug 66 extending from a cap body 68. The plug has selectively an installed position (FIGS. 12 and 13) and a removed position (FIG. 11) relative to the dental prosthesis 10. The plug 66 comprising a polymeric outer surface 70. The plug 66 has a plug OD 72 on the polymeric outer surface 70. The plug 66 is sized to fit within the pocket 30a. The polymeric outer surface 70 engages the pocket inner surface 28a when the plug 66 is in the installed position. The plug 66 is spaced apart from the dental prosthesis 10 when the plug 66 is in the removed position.

In some examples, the plug OD 72 is greater than a pocket rim ID 74 to provide a snap-fit connection between the polymeric cap 64 and the pocket 30a. In addition or alternatively, in some examples, an adhesive 75 (e.g., a known dual cure resin cement or other known bonding material) at the bottom of the pocket 30a bonds the polymeric cap 64 to the dental prosthesis 10. Some examples of polymeric cap 64 include an optional threaded hole 77, which can provide several benefits.

A tool with a threaded end can be screwed into the threaded hole 77 to facilitate installing or removing of the polymeric cap 64 within the pocket 30a. The threaded hole 77 can provide physical structure to which the adhesive 75 can bond securely. The threaded hole 77 can also provide a clear opening for UV light to pass in examples where the adhesive 75 is a UV light curing adhesive.

The cap body 68 defines a cap receptacle 76 with a cap mouth ID 78. In some examples, the cap mouth ID 78 equals the pocket rim ID 46, so the abutment 18 can fit either directly into the pocket 30 or into the polymeric cap 64.

The abutment 18 comprising the head 34 extending from the abutment body 36. The head 34 has selectively an engaged position (FIG. 13) and a disengaged position (FIGS. 11 and 12) relative to the polymeric cap 64. At least most of the head 34 is sized to fit within the cap receptacle 76. The abutment body 36 is connectable to the jaw 12 via the threaded connection 24 with the implant 20. The head 34 engages the polymeric cap 64 when the head 34 is in the installed position. The head 34 is spaced apart from the polymeric cap 64 when the head 34 is in the removed position. The snap-fit head OD 38 is greater than the cap mouth ID 78 to provide a snap-fit connection between the two.

In some examples, the dental prosthesis 10 is a first unitary monolithic structure including the pocket inner surface 28a, and the polymeric cap 64 is a second unitary monolithic structure. In some examples, the dental prosthesis 10 is made of a zirconia-based ceramic, which has superior hardness, wear resistance, and appearance.

In some examples, the polymeric cap 64 is made of a polymeric material 80 selected from the group consisting of PEEK (polyetheretherketone), POM (polyoxymethylene, polyacetal, Delrin, Celcon, etc.), POM-C (polyoxymethylene copolymer), and POM-H (polyoxymethylene homopolymer). In some examples, the polymeric cap 64 preferably has a durometer Shore-D hardness of at least D85 (at 73 degrees Fahrenheit). In some examples, the polymeric cap 64 is preferably harder than nylon but softer than dental prosthesis 10. Compared to nylon, the relative hardness of PEEK seems to provide an excellent snap-fit connection while minimizing wear and creep. The titanium nitride coating 44 on the abutment 18 seems to further improve the snap-fit connection and wear resistance.

Figure 14:
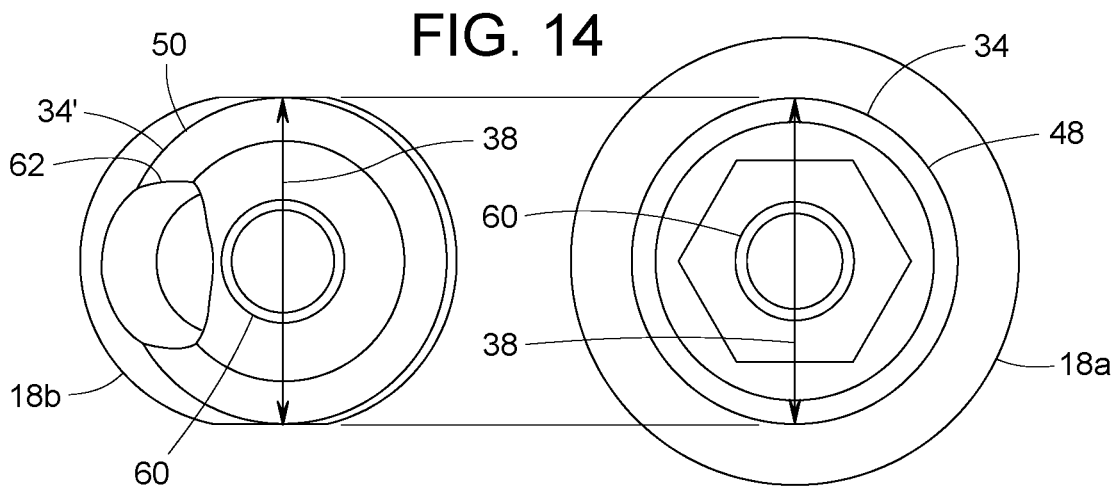
FIG. 14 show end views comparing the snap-fit head OD of a straight abutment and an angular abutment.
Figure 15:
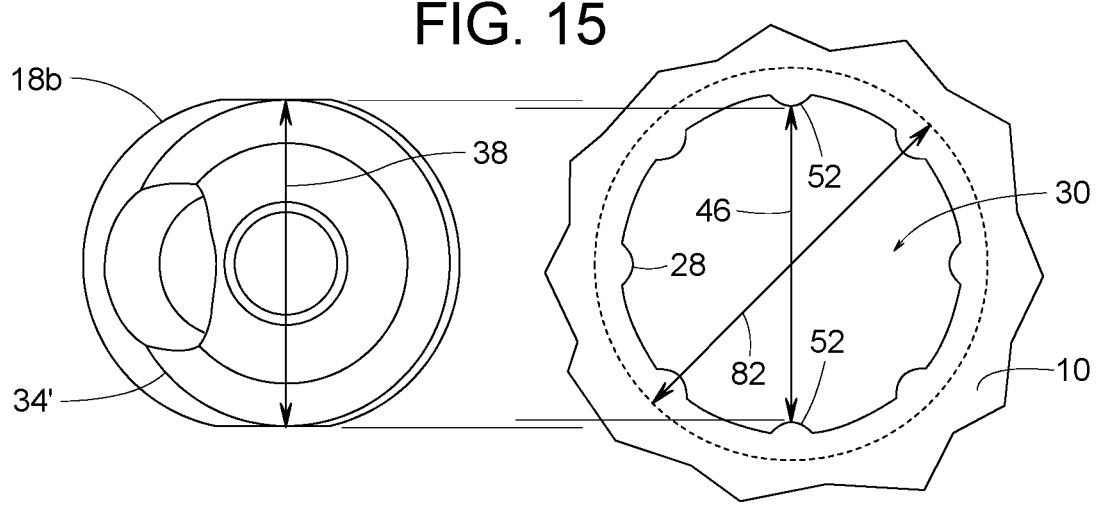
FIG. 15 show end views comparing an abutment's snap-fit OD to the pocket rim ID and relief ID of a pocket in a dental prosthesis.
Figure 16:
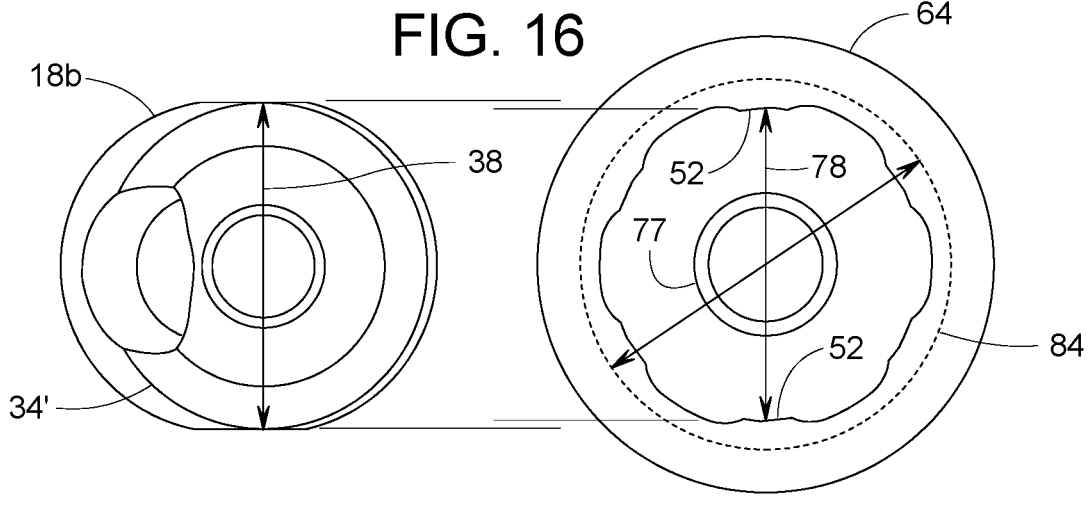
FIG. 16 show end views comparing an abutment's snap-fit OD to the cup mouth ID and relief ID of a polymeric cap.

FIGS. 14-16 illustrate more specifics on some ODs, IDs, and snap-fit examples. It should be noted that axial locations of the ODs and corresponding IDs can be anywhere along the height the head 34 or plug 66. For instance, in some examples, the snap-fit OD 38 of an abutment's head 34 can be near the base of the frustoconical portion 54 (as illustrated), near the top of the frustoconical portion 54, or somewhere in-between. In examples where the abutment's head 34 is spherical, the snap-fit OD 38 will be at the sphere's major outer diameter. FIG. 14 shows that in some examples, the snap-fit head OD 38 of the angular abutment 18b is equal to the snap-fit head OD 38 of the straight abutment 18a.

FIG. 15 shows that in some embodiments, the snap-fit head OD 38 of the angular abutment 18b is 0.001 to 0.006 inches larger than the pocket rim ID 46 to provide a desirable range of holding force. FIG. 15 also shows the pocket 30 having a relief ID 82 that is larger than the snap-fit head OD 38 to provide a snap-fit connection with desirable tactile and audible feedback.

FIG. 16 shows that in some embodiments, the snap-fit head OD 38 of the angular abutment 18b is 0.001 to 0.006 inches larger than the cap mouth ID 78 to provide a desirable range of holding force. FIG. 16 also shows the polymeric cap 64 having a relief ID 84 that is larger than the snap-fit head OD 38 to provide a snap-fit connection with desirable tactile and audible feedback.

The dental assemblies shown in FIGS. 1-16 have a minimum number of parts and eliminate the need for a metal housing bonded or otherwise connected to the dental prosthesis 10. By eliminating the metal housing, the dental assembly is more secure, and there are fewer joints that might harbor bacteria.

Figure 17:
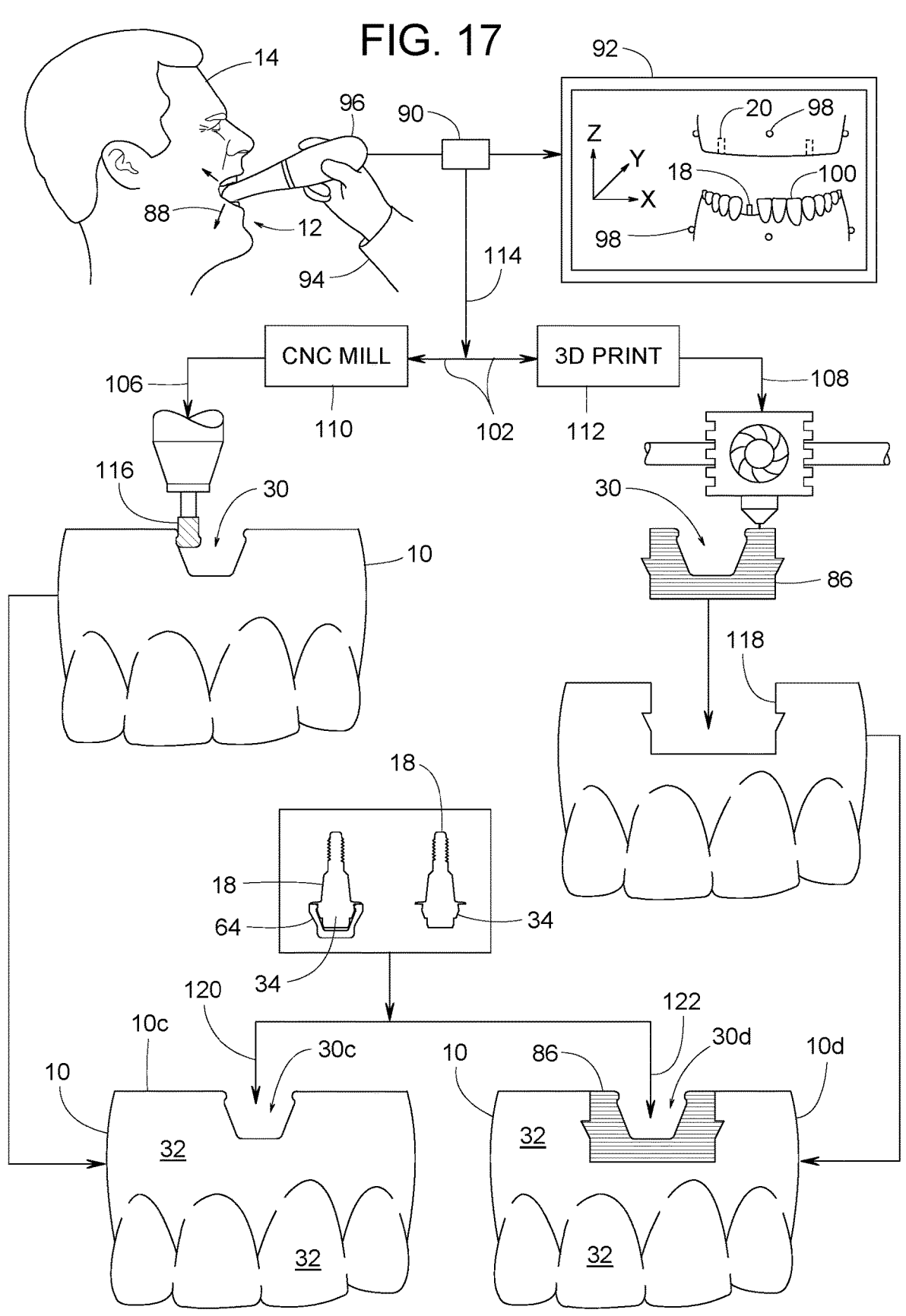
FIG. 17 is a schematic diagram showing various steps of a dental method in accordance to the teachings disclosed herein.

FIG. 17 shows example dental methods associated with connecting a dental prosthesis 10c or 10d to the jaw 12 of the patient 14. The dental prosthesis 10c is basically the same as the dental prosthesis 10a and 10b. The dental prosthesis 10d is similar as well but includes an insert 86 that provides the pocket 30 for receiving the abutment 18.

Arrow 988 represents scanning the jaw 12 to create a scanning record 90. In some examples, a computer 92 and known software can assist in designing the dental prosthesis 10 (e.g., dental prosthesis 10c or 10d). In some examples, scanning is done by a dentist 94 using an intraoral scanner 96 and/or a known CT scanner. The scanning record 90 is a file containing coordinate data on various features of the jaw 12, such as the location and dimensions of teeth 100, bone 12b, gums 12a, implants 20, abutments 18, fiducial markers 98, etc. More information on scanning can be found in Patrick C. Bell et al. U.S. Pat. No. 11,612,451: which specifically incorporated herein by reference.

Arrow 102 represents creating the dental prosthesis 10 such that the dental prosthesis 10 fits the jaw 12, wherein the dental prosthesis 10 is made of the first material 32 selected from the group consisting of a polymer and a zirconia-based ceramic. Arrow 22 (FIG. 1) represents installing the implant 20 into the jaw 12. Arrow 104 (FIG. 1) represents attaching the abutment 18 to the implant 20.

Arrows 106 and 108 represent providing the dental prosthesis 10 (e.g., dental prosthesis 10c or 10d) with a pocket 30 (e.g., pocket 30 or 30a) by using a manufacturing method selected from the group consisting of CNC milling 110 and 3D printing 112, wherein the manufacturing method is performed with a reference 114 to the scanning record 90. CNC milling refers to a machine with a digital controller that controls the travel movement of a rotating cutter 116. FIG. 17 shows the CNC milling machine 110 milling the pocket 30 directly into the dental prosthesis 10c.

As an alternative to milling, FIG. 17 also shows the 3D printer 112 printing the insert 86 by way of a known 3D printing process. 3D printing refers to any digitally controlled machine that builds an object by laying down many thin layers of a material in succession to materialize a previously created virtual three-dimensional digital model. Some examples of known 3D printing processes include stereolithography (SLA), selective laser sintering (SLS), fused deposition modeling (FDM), digital light process (DLP), direct metal laser sintering (DMLS) and electron beam melting (EBM).

In some examples, the insert 86 snaps into a cavity 118 in the dental prosthesis 10d. In some examples, a screw fastens the insert 86 to the dental prosthesis 10d.

Arrows 120 and 122 represent snap-fitting the head 34 of the abutment 18 (e.g., straight abutment 18a or angular abutment 18b) to the dental prosthesis 10. In some examples, the abutment's head 34 can be snapped directly into the pocket 30c or 30d. In some examples, the abutment's head 34 can be snapped into the pocket 30c or 30d indirectly by using the polymeric cap 64.

FIG. 18 further illustrates various example dental methods associated with connecting a dental prosthesis 10 to the jaw 12 of the patient 14. The blocks or methods steps are not necessarily performed in the order shown. Some steps can be performed concurrently and/or in a difference sequence. A block 124 represents creating the scanning record 90 by scanning the jaw 12. A block 126 represents creating the dental prosthesis 10 such that the dental prosthesis 10 fits the jaw 12, wherein the dental prosthesis 10 is of a first material selected from the group consisting of a polymer and a zirconia-based ceramic. A block 128 represents installing the implant 10 into the jaw 12. A block 130 represents attaching the abutment 10 to the implant 20, wherein the abutment 10 comprises the head 34 on the abutment body 36. A block 132 represents providing the dental prosthesis 10 with the pocket 30 by using a manufacturing method selected from the group consisting of CNC milling and 3D printing, wherein the manufacturing method is performed with reference to the scanning record 90. A block 134 represents snap-fitting the head 34 of the abutment 18 to the pocket 30.

Some examples of the dental assembly 16 and associated dental method can be defined by the following examples 1-29:

Example-1) A dental assembly connectable to a jaw of a patient, the dental assembly comprising: a dental prosthesis to be attached to the jaw, the dental prosthesis comprising a pocket inner surface defining a pocket in the dental prosthesis, the pocket having a pocket rim ID, the pocket inner surface being of a first material selected from the group consisting of a polymer and a zirconia-based ceramic; and an abutment comprising a head extending from an abutment body, the head having selectively an engaged position and a disengaged position relative to the dental prosthesis, the head having a snap-fit head OD, at least most of the head being sized to fit within the pocket, the abutment body being connectable to the jaw of the patient, the head engaging the pocket inner surface when the head is in the installed position, the head being spaced apart from the dental prosthesis when the head is in the removed position, and the snap-fit head OD being greater than the pocket rim ID.

Example-2) The dental assembly of Example 1, further comprising an implant attachable to the jaw, and the abutment body being attached to the implant by way of a threaded connection.

Example-3) The dental assembly of Example 1, wherein the head of the abutment has a titanium nitride coating.

Example-4) The dental assembly of Example 1, wherein the snap-fit head OD is 0.001 to 0.006 inches larger than the pocket rim ID.

Example-5) The dental assembly of Example 1, wherein the dental prosthesis is a first unitary monolithic structure including the pocket inner surface.

Example-6) The dental assembly of Example 1, wherein the dental prosthesis is a first unitary monolithic structure including the pocket inner surface, and a combination of the abutment body and the head is a second unitary monolithic structure.

Example-7) The dental assembly of Example 1, wherein the abutment comprises a base material coated with titanium nitride, and the first material of the dental prosthesis is harder than the base material.

Example-8) The dental assembly of Example 1, wherein the head comprises a frustoconical portion with an apex angle substantially equal to 43 degrees.

Example-9) A dental assembly connectable to a jaw of a patient, the dental assembly comprising: a dental prosthesis to be attached to the jaw, the dental prosthesis comprising a pocket inner surface defining a pocket in the dental prosthesis, the pocket having a pocket rim ID, the pocket inner surface being of a first material selected from the group consisting of a polymer and a zirconia-based ceramic: a polymeric cap comprising a plug extending from a cap body, the plug having selectively an installed position and a removed position relative to the dental prosthesis, the plug comprising a polymeric outer surface, the plug having a plug OD on the polymeric outer surface, the cap body defining a cap receptacle having a cap mouth ID, the plug being sized to fit within the pocket, the polymeric outer surface engaging the pocket inner surface when the plug is in the installed position, the plug being spaced apart from the dental prosthesis when the plug is in the removed position, the plug OD being greater than the pocket rim ID; and an abutment comprising a head extending from an abutment body, the head having selectively an engaged position and a disengaged position relative to the polymeric cap, the head having a snap-fit head OD, at least most of the head being sized to fit within the cap receptacle, the abutment body being connectable to the jaw of the patient, the head engaging the polymeric cap when the head is in the installed position, the head being spaced apart from the polymeric cap when the head is in the removed position, and the snap-fit head OD being greater than the cap mouth ID.

Example-10) The dental assembly of Example 9, further comprising an implant attachable to the jaw, and the abutment body being attached to the implant by way of a threaded connection.

Example-11) The dental assembly of Example 9, wherein the head of the abutment has a titanium nitride coating.

Example-12) The dental assembly of Example 9, wherein the plug OD is 0.001 to 0.006 inches larger than the pocket rim ID.

Example-13) The dental assembly of Example 9, wherein the snap-fit head OD is 0.001 to 0.006 inches larger than the cap mouth ID.

Example-14) The dental assembly of Example 9, wherein the dental prosthesis is a first unitary monolithic structure including the pocket inner surface.

Example-15) The dental assembly of Example 9, wherein the dental prosthesis is a first unitary monolithic structure including the pocket inner surface, and the polymeric cap is a second unitary monolithic structure.

Example-16) The dental assembly of Example 9, wherein the abutment comprises a base material coated with titanium nitride, and the first material of the dental prosthesis is harder than the base material.

Example-17) The dental assembly of Example 9, wherein the head comprises a frustoconical portion with an apex angle substantially equal to 43 degrees.

Example-18) A dental method for connecting a dental prosthesis to a jaw of a patient, the dental method comprising: creating a scanning record by scanning the jaw: creating the dental prosthesis such that the dental prosthesis fits the jaw, the dental prosthesis being of a first material selected from the group consisting of a polymer and a zirconia-based ceramic; installing an implant into the jaw: attaching an abutment to the implant, wherein the abutment comprises a head on an abutment body: providing the dental prosthesis with a pocket by using a manufacturing method selected from the group consisting of CNC milling and 3D printing, wherein the manufacturing method is performed with reference to the scanning record; and snap-fitting the head of the abutment to the pocket.

Example-19) The dental method of Example 18, wherein the manufacturing method is CNC milling the pocket into the first material.

Example-20) The dental method of Example 18, wherein the pocket has a pocket rim ID, the head on the abutment has a snap-fit head OD that is greater than the pocket rim ID, the head has selectively an engaged position and a disengaged position relative to the dental prosthesis, at least most of the head is sized to fit within the pocket, the abutment body is connected to the implant, the head is in direct contact with the first material of the prosthesis when the head is in the engaged position, the head is spaced apart from the dental prosthesis when the head is in the disengaged position, and the snap-fit head OD is greater than the pocket rim ID.

Example-21) The dental method of Example 18, wherein snap-fitting the head of the abutment to the pocket involves using a polymeric cap comprising a plug extending from a cap body, the plug having selectively an installed position and a removed position relative to the dental prosthesis, the plug comprising a polymeric outer surface, the plug having a plug OD on the polymeric outer surface, the cap body defining a cap receptacle having a cap mouth ID, the plug being sized to fit within the pocket, the polymeric outer surface of the plug engaging the first material of the dental prosthesis when the plug is in the installed position, the plug being spaced apart from the dental prosthesis when the plug is in the removed position, the plug OD being greater than the pocket rim ID, the head of the abutment having selectively an engaged position and a disengaged position relative to the polymeric cap, the head having a snap-fit head OD, at least most of the head being sized to fit within the cap receptacle, the head engaging the polymeric cap when the head is in the installed position, the head being spaced apart from the polymeric cap when the head is in the removed position, and the snap-fit head OD is greater than the cap mouth ID.

Example-22) The dental method of Example 18, wherein the manufacturing method is 3D printing, and the dental method further comprising: 3D printing an insert such that insert defines the pocket; and attaching the insert to the dental prosthesis so the insert becomes part of the dental prosthesis.

Example-23) The dental method of Example 18, wherein the insert is of a second material distinguishable from the first material, the pocket has a pocket rim ID, the head on the abutment has a snap-fit head OD that is greater than the pocket rim ID, the head has selectively an engaged position and a disengaged position relative to the insert of the dental prosthesis, at least most of the head is sized to fit within the pocket, the abutment body is connected to the implant, the head is in direct contact with the second material of the insert when the head is in the engaged position, the head is spaced apart from the dental prosthesis when the head is in the disengaged position, and the snap-fit head OD is greater than the pocket rim ID.

Example-24) The dental method of Example 18, wherein the insert is of a second material distinguishable from the first material and snap-fitting the head of the abutment to the pocket involves using a polymeric cap comprising a plug extending from a cap body, the plug having selectively an installed position and a removed position relative to the insert of the dental prosthesis, the plug comprising a polymeric outer surface, the plug having a plug OD on the polymeric outer surface, the cap body defining a cap receptacle having a cap mouth ID, the plug being sized to fit within the pocket, the polymeric outer surface of the plug engaging the second material of the dental prosthesis when the plug is in the installed position, the plug being spaced apart from the dental prosthesis when the plug is in the removed position, the plug OD being greater than the pocket rim ID, the head of the abutment having selectively an engaged position and a disengaged position relative to the polymeric cap, the head having a snap-fit head OD, at least most of the head being sized to fit within the cap receptacle, the head engaging the polymeric cap when the head is in the installed position, the head being spaced apart from the polymeric cap when the head is in the removed position, and the snap-fit head OD is greater than the cap mouth ID.

Example-25) The dental method of Example 18, wherein the head of the abutment has a titanium nitride coating.

Example-26) The dental method of Example 20, wherein the snap-fit head OD is 0.001 to 0.006 inches larger than the pocket rim ID.

Example-27) The dental method of Example 18, wherein the dental prosthesis is a first unitary monolithic structure extending all the way to the pocket.

Example-28) The dental method of Example 18, wherein the abutment comprises a base material plated with titanium nitride, and the first material of the dental prosthesis is harder than the base material.

Example-29) The dental method of Example 18, wherein the head comprises a frustoconical portion with an apex angle of 40 to 46 degrees.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A dental assembly connectable to a jaw of a patient, the dental assembly comprising:
   a dental prosthesis to be attached to the jaw, the dental prosthesis comprising a pocket inner surface defining a pocket in the dental prosthesis, the pocket having a pocket rim ID, the pocket inner surface being of a first material selected from the group consisting of a polymer and a zirconia-based ceramic; and
an abutment comprising a head extending from an abutment body, the head having selectively an engaged position and a disengaged position relative to the dental prosthesis, the head having a snap-fit head OD, at least most of the head being sized to fit within the pocket, the abutment body being connectable to the jaw of the patient, the head engaging the pocket inner surface when the head is in the installed position, the head being spaced apart from the dental prosthesis when the head is in the removed position, and the snap-fit head OD being greater than the pocket rim ID, wherein the abutment comprises a base material coated with titanium nitride, and the first material of the dental prosthesis is harder than the base material.

2. The dental assembly of claim 1, further comprising an implant attachable to the jaw, and the abutment body being attached to the implant by way of a threaded connection.

3. The dental assembly of claim 1, wherein the head of the abutment has a titanium nitride coating.

4. The dental assembly of claim 1, wherein the snap-fit head OD is 0.001 to 0.006 inches larger than the pocket rim ID.

5. The dental assembly of claim 1, wherein the dental prosthesis is a first unitary monolithic structure including the pocket inner surface.

6. The dental assembly of claim 1, wherein the dental prosthesis is a first unitary monolithic structure including the pocket inner surface, and a combination of the abutment body and the head is a second unitary monolithic structure.

7. The dental assembly of claim 1, wherein the head comprises a frustoconical portion with an apex angle substantially equal to 43 degrees.

8. A dental assembly connectable to a jaw of a patient, the dental assembly comprising:

a dental prosthesis to be attached to the jaw, the dental prosthesis comprising a pocket inner surface defining a pocket in the dental prosthesis, the pocket having a pocket rim ID, the pocket inner surface being of a first material selected from the group consisting of a polymer and a zirconia-based ceramic;

a polymeric cap comprising a plug extending from a cap body, the plug having selectively an installed position and a removed position relative to the dental prosthesis, the plug comprising a polymeric outer surface, the plug having a plug OD on the polymeric outer surface, the cap body defining a cap receptacle having a cap mouth ID, the plug being sized to fit within the pocket, the polymeric outer surface engaging the pocket inner surface when the plug is in the installed position, the plug being spaced apart from the dental prosthesis when the plug is in the removed position;

an abutment comprising a head extending from an abutment body, the head having selectively an engaged position and a disengaged position relative to the polymeric cap, the head having a snap-fit head OD, at least most of the head being sized to fit within the cap receptacle, the abutment body being connectable to the jaw of the patient, the head engaging the polymeric cap when the head is in the installed position, the head being spaced apart from the polymeric cap when the head is in the removed position, and the snap-fit head OD being greater than the cap mouth ID; and an adhesive between the plug and the pocket inner surface.

9. The dental assembly of claim 8, further comprising an implant attachable to the jaw, and the abutment body being attached to the implant by way of a threaded connection.

10. The dental assembly of claim 8, wherein the head of the abutment has a titanium nitride coating.

11. The dental assembly of claim 9, wherein the plug OD is 0.001 to 0.006 inches larger than the pocket rim ID.

12. The dental assembly of claim 8, wherein the snap-fit head OD is 0.001 to 0.006 inches larger than the cap mouth ID.

13. The dental assembly of claim 8, wherein the dental prosthesis is a first unitary monolithic structure including the pocket inner surface.

14. The dental assembly of claim 8, wherein the dental prosthesis is a first unitary monolithic structure including the pocket inner surface, and the polymeric cap is a second unitary monolithic structure.

15. The dental assembly of claim 8, wherein the abutment comprises a base material coated with titanium nitride, and the first material of the dental prosthesis is harder than the base material.

* * * * *